US006484490B1

(12) United States Patent
Olsen et al.

(10) Patent No.: US 6,484,490 B1
(45) Date of Patent: Nov. 26, 2002

(54) GAS TURBINE SYSTEM AND METHOD

(75) Inventors: Andrew J. Olsen, Amesbury, MA (US); John H. Thomson, North Berwick, ME (US); Jason K. Hargrove, Lee, NH (US)

(73) Assignee: Ingersoll-Rand Energy Systems Corp., Portsmouth, NH (US)

( * ) Notice: Subject to any disclaimer, the term of this patent is extended or adjusted under 35 U.S.C. 154(b) by 0 days.

(21) Appl. No.: 09/679,555

(22) Filed: Oct. 6, 2000

Related U.S. Application Data

(60) Provisional application No. 60/202,952, filed on May 9, 2000.

(51) Int. Cl.$^7$ .................................................. F02C 3/22

(52) U.S. Cl. .................................. 60/39.281; 60/39.465

(58) Field of Search ......................... 60/39.181, 39.281, 60/39.465, 685; 290/52; 324/122

(56) References Cited

U.S. PATENT DOCUMENTS

| 3,586,970 | A | * | 6/1971 | Conway et al. ............. 374/122 |
| 4,178,754 | A | * | 12/1979 | Earnest .................... 60/39.181 |
| 5,606,853 | A | * | 3/1997 | Birch et al. .............. 60/39.281 |
| 5,903,060 | A | * | 5/1999 | Norton ........................ 60/685 |
| 6,066,898 | A | * | 5/2000 | Jensen ......................... 290/52 |

FOREIGN PATENT DOCUMENTS

WO    WO 01/40644 A1    11/2000

* cited by examiner

*Primary Examiner*—Michael Koczo
(74) *Attorney, Agent, or Firm*—Michael Best & Friedrich LLP

(57) ABSTRACT

A gas booster system in which a variable frequency drive is used to control, by means of a variable speed motor, the compression rate of a pump in a gas turbine combustion engine. The rate of the variable speed motor, and thus the rate of compression, is controlled by monitoring turbine temperature. The gas turbine system responds to the turbine temperature to regulate the rate of compression of the fuel.

22 Claims, 1 Drawing Sheet

GAS TURBINE SYSTEM AND METHOD

CROSS-REFERENCE TO RELATED APPLICATIONS

This application claims the benefit of and priority to United States Provisional Patent Application Ser. No. 60/202,952 entitled "GAS BOOSTER SYSTEM" filed on May 9, 2000, the entire contents of which are incorporated by reference herein.

BACKGROUND

This invention relates to a system and a method for increasing the efficiency and for improving the control of gas turbines and associated gas booster systems.

Gas booster systems for gas turbine (e.g. microturbine) systems are well known. A conventional gas turbine system typically includes a gas booster system to supply pressurized gaseous fuel to a combustion chamber that generates high temperature exhaust for the turbine. Various parameters have been used to control the flow rate and pressure of the fuel being supplied to the gas turbine engine. An example of a conventional system is disclosed in U.S. Pat. No. 4,178,754. This system includes a positive displacement gear type fuel pump. The fuel pressure is controlled by bypassing flow using a pressure regulator. The fuel flow rate is controlled using a metering valve. The regulator and the metering valve operate in response to turbine operating conditions as represented by the following parameters: turbine inlet temperature, compressor inlet temperature, and compressor exit pressure. Similarly, in U.S. Pat. No. 5,850,733, which is incorporated herein by reference, the fuel flow to a gas turbine is controlled, in part, based on the gas turbine exhaust temperature.

In some conventional gas turbine systems, a reciprocating type compressor is used to compress the natural gas being used as fuel in the gas turbine combustion engine. These reciprocating compressors normally operate at a fixed rate of displacement. Accordingly, to regulate the fuel flow rate into the compressor, a system of valves is opened or closed in response to various system parameters. These systems are generally disfavored because the number of valves required in such a system require many pipe connections, resulting in an increased risk of leaks due to the intense vibrations generated by reciprocating compressors. Moreover, such systems include a significant lag-time between the time when the parameter is detected and the time when the system adequately responds by opening or closing one of the valves in the system.

U.S. Pat. No. 5,606,853 describes a system in which the rate of compression in a screw type compressor can be changed using a variable speed motor. By changing the compression rate, the fuel flow rate into the combustion chamber can be adjusted thereby eliminating the need for a system of valves which are opened and closed in response to a measured system parameter. The speed of the motor driving the compressor is dependant on a computer signal generated in response to a measurement of the power output of the turbine. However, measurements of turbine power output do not provide as accurate a measure of system conditions as do measurements of the turbine temperature. Specifically, fuel demand is more accurately determined by measuring turbine inlet and exhaust temperatures. Thus, there remains a need to provide a gas booster system that automatically supplies the appropriate amount of fuel at the appropriate pressure to the combustion chamber based on either the turbine inlet or exhaust temperature.

The present invention addresses this need and provides other benefits as described further below.

SUMMARY OF THE INVENTION

The system provides a gas turbine system comprising: a pump for providing a gaseous fuel to a combustion chamber which produces an exhaust; an electric motor which drives the pump; a turbine which receives the exhaust from the combustion chamber; a sensor which measures a parameter of the temperature of the turbine; and a controller which adjusts the speed of said electric motor in response to the turbine temperature.

Preferably, the pump is a positive displacement pump, and among positive displace pumps it is ideally a rotary screw pump. Additionally, the sensor is preferably a thermocouple. The sensor may be positioned to measure the turbine temperature at an inlet or at an outlet of the turbine. The sensor may measure the turbine temperature by measuring the temperature of the combustion chamber exhaust before it enters the turbine inlet or by measuring the temperature of turbine exhaust which exits through the turbine outlet. Alternatively, the sensor may measure the turbine temperature by measuring the temperature of a metal part of the turbine inlet or outlet.

The controller controls the speed of the variable speed motor by sending a control signal, which is responsive to the temperature measured by the sensor, to a variable frequency drive. The variable frequency drive, in turn, adjusts the speed of the variable speed motor in response to the control signal sent by the controller. The control signal from the controller may be generated in numerous ways. In a first embodiment, a difference between the turbine temperature and a predetermined second temperature may be determined by the controller. A control signal corresponding to the difference between the temperatures may then be sent to the variable frequency drive which, in turn, adjusts the speed of the variable speed motor.

In this first embodiment, if the sensor is positioned at the turbine inlet, the predetermined second temperature may be between 1400° and 1700° F., and is preferably approximately 1600° F. If, on the other hand, the sensor is positioned at the turbine outlet, the predetermined second temperature may be between 1175° and 1550° F.

In a second embodiment, the controller may send a control signal which is responsive to the measured turbine temperature (rather than to a difference between the turbine temperature and a predetermined second temperature) to the variable frequency drive. The variable frequency drive may then adjust the speed of the variable speed motor in response to the control signal.

Finally, the system may include a hermetically sealed passage connecting the pump to the combustion chamber. In this case, the hermetic seal ideally comprises a magnetic coupling.

A method for controlling a gas turbine system is also contemplated. The method includes: compressing a gaseous fuel with a pump controlled by an electric motor; forcing the compressed gaseous fuel into a combustion chamber; igniting the compressed gaseous fuel in the combustion chamber and thereby producing an exhaust which enters a turbine; measuring a temperature of the turbine; and controlling the speed of the electric motor in response to the turbine temperature.

In following this method, the step of compressing of the gaseous fuel is preferably completed by a positive displacement pump, and among positive displacement pumps it is ideally a rotary screw pump. The step of measuring the temperature of the turbine includes positioning a sensor, which is preferably a thermocouple, either at an inlet or at an out of the turbine. Moreover, the step of measuring the turbine temperature, contemplates either measuring the temperature of the combustion chamber exhaust before the exhaust enters the turbine through the turbine inlet or measuring the temperature of an exhaust which exits the turbine through the turbine outlet. In the alternative, the step of measuring the turbine temperature can be completed by measuring the temperature of a metal part of either the turbine inlet or the turbine outlet.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiment shown in the drawings, which are briefly described below.

DETAILED DESCRIPTION

Figure 1:
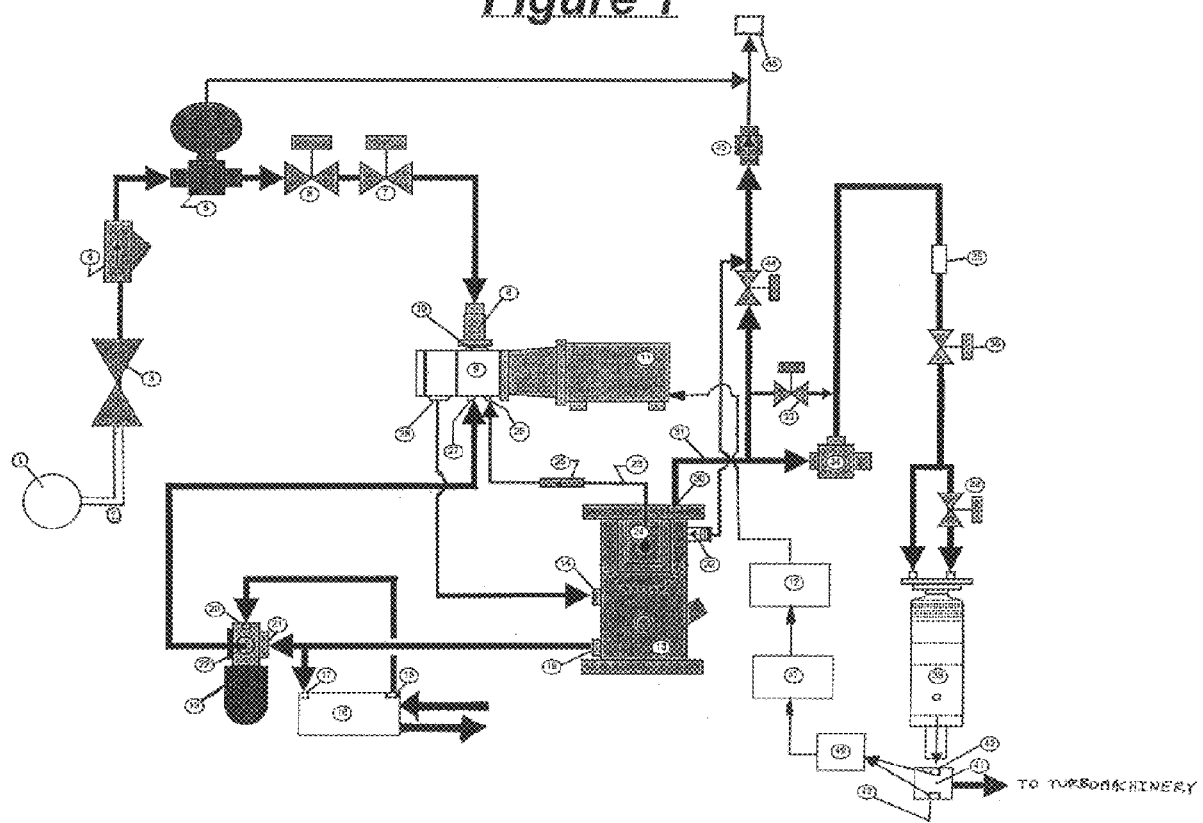
FIG. 1 is a block diagram of the preferred embodiment of the system setup used to accomplish the invention.

The present invention includes a gas booster system for a gas turbine. The booster system includes a pump which is controlled by a variable speed motor to compress the gaseous fuel. The speed of the variable speed motor is set by a variable frequency drive which is controlled by a process logic controller which, in turn, is responsive to the measured turbine temperature. Ideally, the pump is a positive displacement pump, and among positive displacement pumps, a rotary screw compressor is most preferred. The gaseous fuel is preferably natural gas and can be supplied by any source of continuous supply, such as a natural gas pipeline.

The gaseous fuel compressed by the pump is purified in a gas/oil separator tank in which entrained oil is removed. The oil which is removed is sent to a heat exchanger and/or sent directly to a lube oil filter/thermal bypass. The cooled oil may be returned to the pump. The gaseous fuel, with the entrained oil removed, is made available by the gas/oil separator tank to a combustion chamber when the pressure in a minimum pressure check valve (which is positioned between the gas/oil separator and the combustion chamber) rises to 39–42 psig; at this pressure the minimum pressure check valve opens allowing the gaseous fuel to enter the combustion chamber. While in the combustion chamber, the gaseous fuel is ignited producing a high-temperature exhaust. The high-temperature exhaust is forced into a turbine; the heat from the exhaust drives the turbine. When the heat from the high-temperature exhaust is consumed by the turbine, the exhaust exits the turbine as low-temperature exhaust.

A method for improving the speed and accuracy by which a gas turbine system is controlled is provided. A typical installation might have a gas line 2 pressure at 8" of water column. The system draws in the low pressure gas which is always above vacuum to prevent air entry, and compresses it based on engine demand with approximately 5 psig more than combustion chamber 39 pressure, typically 35–45 psig. As the combustion chamber pressure increases with increased load, the gas pump 9 being a positive displacement device, will follow the pressure and maintain the margin so that gas pressure is always greater than combustion chamber 39 pressure. This is accomplished without a throttle valve.

The gas booster system may be controlled so that the compression rate of the fuel is set to match turbine demand and operating conditions. The present invention accomplishes fuel flow matching without bypassing fuel as required by conventional systems. The booster system provides fuel at the flow rate and pressure required by the engine for maximum efficiency.

As a practical matter, microturbines (30 kw to 500 kw turbine generators) operate most efficiently at a particular temperature. The present invention recognizes this fact, and allows turbine operation to be regulated to maintain turbine temperature at the appropriate temperature ratio with respect to ambient temperature. Preferably, turbine inlet temperature is monitored to determine the proper pump or compressor speed.

Turbine inlet temperature is the preferred temperature parameter by which the gas booster system is controlled because: (a) it is more accurate than the turbine exhaust temperature; (b) it is easier to measure than the internal turbine temperature; and (c) there is significantly less lag time between a change in turbine condition being detected than with other parameters such as, for example, turbine power.

Alternatively, turbine exit temperature may be used to control the gas booster system. The present invention can use a measurement of turbine exhaust temperature (instead of measurements of turbine inlet or internal temperatures) as the parameter by which the rate is compression is ultimately controlled. However, the accuracy in controlling the system is improved when the turbine inlet temperature is used because inlet temperature is much higher than the turbine exhaust temperature and is more reflective of the system conditions than is the turbine exhaust temperature.

As shown in FIG. 1, a combustible gaseous fuel, which is preferably natural gas carried from a remote source 1 by a natural gas pipeline 2, enters the system and passes through a manual shutoff valve 3 and then through a gas inlet strainer 4. Upon entering the system, the fuel enters a low pressure inlet regulator 5. The low pressure inlet regulator 5 regulates the pressure of the gaseous fuel. If the low pressure inlet regulator 5 fails, an orifice will restrict the fuel but will allow it to pass to a vent 46. After the gaseous fuel passes through the low pressure inlet regulator 5, the fuel passes through the two solenoid valves 6, 7 (which are energized open). The valves may shut to prevent fuel flow to the combustion chamber, as described further below. A check valve 8 may be provided at the inlet to a pump 9, which is preferably a positive displacement pump. Among positive displacement pumps, a rotary screw compressor is most preferred. The gaseous fuel from the check valve 8 enters the pump 9 through fuel inlet port 10. The pump 9 is preferably hermetically sealed at all locations to prevent a loss of gaseous fuel. A magnetic coupling is the preferred type of seal. The pump 9 compresses the fuel and is controlled by a variable speed motor 11. The degree of compression in the pump 9 is regulated by a variable frequency drive 12. The variable frequency drive 12 responds to a control signal, generated by a process logic controller 47, which is responsive to system parameters discussed.

After being compressed, the fuel leaves the pump 9 through outlet port 28 and enters a gas/oil separator tank 13 through separator tank inlet port 14. Once in the gas/oil separator tank 13, oil entrained in the gaseous fuel is removed. The oil removed from the fuel exits the gas/oil separator tank 13 through outlet port 15. The oil then enters an oil/oil heat exchanger 16 through inlet port 17. The oil, which maybe cooled in the heat exchanger 16 by gasifier lube oil on any suitable coolant, exits the heat exchanger 16 through outlet port 18 and then enters a lube oil filter/thermal bypass 19 via inlet port 20. Alternatively, the oil removed from the gas/oil separator tank 13 may bypass the heat exchanger 16 and may be provided to the filter 19 through inlet port 21. Oil that passes through the oil filter/thermal bypass 19 may be returned to the pump 9 through an inlet port 27.

If the pressure in the gas/oil separator tank 13 rises above a predetermined pressure, a gas/oil separator high pressure relief valve 32 will be open allowing the pressurized gaseous fuel to flow through a check valve 45 and then exit the system through a vent 46. The setpoint for the relief valve is preferably 75 psig, but may be as high as approximately 150 psig. Oil removed by the separator tank 13 may also be used for lubricating the pump 9. Oil may leave the separator tank 13 through an outlet port 24 and pass through an oil scavenge tube 23 and an orifice 25 before entering the pump 9 through port 26.

The compressed gaseous fuel exits the separator tank 13 through an outlet port 30 and enters an outlet pipe 31. The gaseous fuel is retained in the separator tank 13 and outlet pipe 31 until the pressure in the outlet pipe 31 reaches 39–42 psig. The flow of the gaseous fuel is stopped because the bypass shutdown solenoid valve 33 and the vent blow-down solenoid valve 44 are closed. When the pressure in the gas/oil separator tank 13 and outlet pipe 31 reaches 39–42 psig, a pressure check valve 34 opens allowing the gaseous fuel to pass into a fuel flow orifice manifold assembly 35. Next, the pressurized gas passes through the main fuel solenoid valve 36. At this point, the fuel can be directed to enter the combustion chamber 39 directly. Or, in the alternative, the fuel can be directed to pass through the pilot fuel solenoid valve 38 also, before entering the combustion chamber 39.

Once in the combustion chamber 39, the gaseous fuel is ignited producing a high-temperature exhaust which then enters a turbine 41 (which drives turbomachinery not show) through turbine inlet port 42. While in the turbine 41, the heat of the exhaust drives the turbine 41. After the heat in the exhaust is expunged, the remaining low-temperature exhaust leaves the turbine 41 through turbine outlet port 43.

The system requires a temperature sensor 40, preferably a thermocouple, to monitor the turbine temperature. The turbine temperature can be measured by the temperature sensor 40 at the inlet 42 through which the high-temperature exhaust enters or at the turbine outlet 43 through which the low-temperature exhaust exits the turbine. The temperature can be measured, at both locations, by placing the temperature sensor on a piece of metal or by measuring the ambient temperature of the exhaust. The preferred location of the temperature sensor 40 is at the turbine inlet port 42 because the higher temperatures measured at that location are more reflective of actual system conditions. While this description refers generally to a single temperature sensor or thermocouple, it is within the scope of the present invention, to provide several sensors or thermocouples in the region of interest in order to provide an accurate measure of turbine temperature and eliminate the effects of temperature spikes.

The temperature sensor 40 produces a signal which is used by the process logic controller 47 to control the rate of the variable frequency drive 12 and thereby control the speed of the variable speed motor 11. As shown in FIG. 1, the variable frequency drive 12 is separate from the motor 11, however, an integral motor/drive unit is within the scope of the invention. The temperature measured by the temperature sensor 40 is used to control the speed of the variable speed motor 11 and, in turn, the rate of compression in the pump 9. The turbine temperature, as measured by the temperature sensor 40, may be compared to a predetermined temperature and the difference could be used to generate a signal which would then be sent to the variable frequency drive 12. The predetermined temperature would be selected based upon where the temperature sensor 40 is located (e.g., turbine inlet). If the temperature sensor 40 were located at the inlet to the turbine, the predetermined temperature range would be from about 1200–1900, preferably in a range from 1400°–1700° F., and most preferably 1600° F. The most preferred temperature range depends on the size and rating of the microturbine being operated. The drop in turbine temperature from the inlet to the outlet is usually about 150°–225° F. Accordingly, if the thermocouple were located at the turbine outlet, the predetermined temperature could range from 975°–1750° F.

Alternatively, the output of the temperature sensor 40 could be used to generate an input signal for the process logic controller 47 which, in turn, could act as an input/output device and which would output a signal (to the variable frequency drive) corresponding to the temperature measured by the temperature sensor 40. The output would depend on where the temperature sensor 40 is located (i.e. at the turbine input or at the turbine outlet).

As described above, the variable speed motor 11 can be controlled in a number of ways by the turbine temperature. Another possibility could allow the measured temperature to be provided directly into the variable frequency drive 12 which could, in turn, respond by raising or lowering the speed of the variable speed motor 11. Of course, other common control methods can also be used.

For example, the controller 47 may control the motor 11 by using derived temperature values based on fuel flow to air flow ratios detected in the turbine. Furthermore, the controller 47 may derive a calculated turbine inlet temperature value based on other detected parameters and basic stoichiometric principles associated with turbine operation.

An improved capability of the gas turbine system to follow engine load results from coupling the variable speed motor 11 to a variable frequency drive 12 which allows flow changes with no bypass valves or relief system. The engine starting sequence always begins with the gas system non-pressurized, the variable speed motor 11 stopped, and the manual shutoff valve 3 in the open position. The next three events occurs simultaneously, or as close to simultaneously as possible: (1) the inlet safety shut-off solenoid valves 6, 7 are energized (opened); (2) the vent blow-down solenoid valve 44 and the bypass shutdown solenoid valve 33 are energized (closed); and (3) the variable speed motor 11 is energized, with zero output (soft start). A starting signal is processed by the process logic controller 47 which sends a control signal to the variable frequency drive 12, which begins to accelerate the variable speed motor 11 and, in turn, the pump 9. The igniter begins to fire and the main and fuel pilot valves 36, 38, respectively, are energized (open).

The process logic controller 47 determines that there is a stable flame in the combustion chamber by calculating the rate of temperature rise on the controlling turbine temperature sensor 40. Based on the temperature just prior to ignition, the process logic controller 47 sends a ramp rate signal to the variable frequency drive 12. The variable frequency drive adjusts the speed of the pump 9 to increase or decrease engine cycle pressure. Typically, once the acceleration sequence has begun, the pump 9, driven by the variable speed motor 11, drives the engine cycle pressure up to a point where the system can synchronize the turbine generator to the electric power grid.

At the initial starting speed, the gas system operates at low efficiency and it takes up to thirty seconds to develop the 30–40 psig required at the pump outlet to open the pressure check valve 34. When the check valve 34 opens, compressed gaseous fuel is allowed to pass through the fuel flow orifice manifold assembly 35. The main fuel valve switch (not shown) actuates the opening of main fuel valve 36 and pilot fuel valve 38 permitting gaseous fuel to enter the combustion chamber 39.

If combustion occurs in the combustion chamber 39, the process logic controller 47 accelerates the variable speed motor 11. However, if the fuel manifold gas pressure does not rise above 30 psig in 30 seconds, a discharge high/low pressure switch (not shown) will shutdown the system. If however, the gas pressure does rise above 30 psig in 30 seconds, the process logic controller 47 will begin to control the rate of the variable speed motor 11 in response to turbine temperature measured by the temperature sensor 40. Once the turbine generator is connected to the electric grid, the control of the system is turned over to a feedback loop. The process logic controller 47 receives the signal generated by the temperature sensor 40, and determines initial step increments of output speed for the variable speed motor 11, and steps the variable frequency drive 12 until the desired turbine temperature is achieved. While, the discussion above is related to connecting the turbine generator directly to an AC electrical grid, it is within the scope of the present invention to utilize a DC generator that supplies power directly to particular equipment or to an AC circuit through a conventional transformer.

In addition, this system can automatically adjust for different inlet pressure conditions, gas quality and other factors. If the gas has a high BTU content, the pump will not need to revolve as fast as when operated with a poor quality gas. The process logic controller 47 controls the pump based on the turbine performance as measured by the temperature sensor 40, and not gas flow. The gas flow and pressure are automatically adjusted based on engine demand.

If combustion does not occur in the combustion chamber 39, power to the system is secured, the vent blow-down solenoid valve 44 and the bypass shutdown solenoid valve 33 are opened, and the inlet safety shutoff solenoid valves 6, 7, the main fuel valve 36 and the pilot fuel valve 38 are closed. Two minutes must pass to allow the gas to vent from the pipes before the ignition sequence can be restarted; if gas pressure remains in the system, the inlet high-pressure switch (not shown) will prevent the system for starting.

Given the disclosure of the present invention, one versed in the art would appreciate that there may be other embodiments and modifications within the scope and spirit of the invention. For example, modifications can be made to the system or to the pump 9 in particular; such as employing a multi-stage pump. Additionally, it is apparent that the speed of the variable speed motor 11 in the system could be regulated by a measurement of other system parameters such as turbine power input, compressor temperature (measured at an inlet, internally, or at an outlet), compressor exit pressure, the gas/oil separator pressure, etc.

Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A gas turbine system comprising:
    a pump for providing a gaseous fuel to a combustion chamber which produces an exhaust;
    an electric motor for driving said pump;
    a turbine for receiving the exhaust of said combustion chamber;
    a sensor measuring a turbine parameter; and
    a controller for adjusting the speed of said electric motor in response to a turbine temperature determined from the measured turbine parameter.

2. The gas turbine system according to claim 1, wherein said parameter is a temperature.

3. The gas turbine system of claim 1, wherein said pump is a positive displacement pump.

4. The gas turbine system according to claim 2, wherein said sensor is positioned to measure the turbine temperature at an inlet of said turbine.

5. The gas turbine system according to claim 4, wherein said sensor measures a temperature of the exhaust before the exhaust enters said turbine through said inlet.

6. The gas turbine system according to claim 1, wherein said motor includes a variable frequency drive.

7. The gas turbine system according to claim 1, wherein said sensor comprises a thermocouple.

8. The gas turbine system according to claim 1, wherein said controller determines a difference between the turbine temperature and a predetermined second temperature, wherein said controller sends a control signal corresponding to the difference between the turbine temperature and the predetermined second temperature to said electric motor, and wherein the speed of said electric motor is adjusted in response to the control signal.

9. The gas turbine system according to claim 8, wherein the predetermined second temperature is between 1200° and 1900° F.

10. The gas turbine system according to claim 9, wherein the predetermined second temperature is approximately 1600° F.

11. The gas turbine system according to claim 8, wherein the predetermined second temperature is between 1000° and 1700° F.

12. The gas turbine system according to claim 1, wherein said controller sends a control signal corresponding to the turbine temperature to a variable frequency drive which controls the speed of said electric motor, and wherein the speed of said electric motor is adjusted in response to the control signal.

13. The gas turbine system according to claim 7, wherein said controller sends a control signal corresponding to the turbine temperature to a variable frequency drive which controls the speed of said electric motor, and wherein the speed of said electric motor is adjusted in response to the control signal.

14. The gas turbine system of claim 3, wherein said positive displacement pump is a rotary screw pump.

15. A gas turbine system comprising:
    a pump for providing a gaseous fuel to a combustion chamber which produces an exhaust;
    an electric motor for driving said pump;
    a turbine for receiving the exhaust of said combustion chamber;

a sensor measuring a turbine parameter; and a controller for adjusting the speed of said electric motor in response to a turbine temperature determined from the measured turbine parameter;

wherein said controller determines a difference between the turbine temperature and a predetermined second temperature, wherein said controller sends a control signal corresponding to the difference between the turbine temperature and the predetermined second temperature to said electric motor, and wherein the speed of said electric motor is adjusted in response to the control signal.

16. The gas turbine system according to claim 15, wherein the predetermined second temperature is between 1200° and 1900° F.

17. The gas turbine system according to claim 16, wherein the predetermined second temperature is approximately 1600° F.

18. The gas turbine system according to claim 15, wherein the predetermined second temperature is between 1000° and 1700° F.

19. The gas turbine system according to claim 2, wherein said sensor is positioned to measure the turbine temperature at an oulet of said turbine.

20. The gas turbine system according to claim 19, where in said sensor measures a temperature of a turbine exhaust which exits said turbine through said outlet.

21. The gas turbine system according to claim 4, wherein said sensor measures a temperature of a metal part of said inlet of said turbine.

22. The gas turbine system according to claim 19, wherein said sensor measures a temperature of a metal part of said outlet of said turbine.

* * * * *